June 5, 1945.
R. C. WILES
2,377,595
VALVE FOR PNEUMATIC TOOLS
Original Filed May 5, 1942
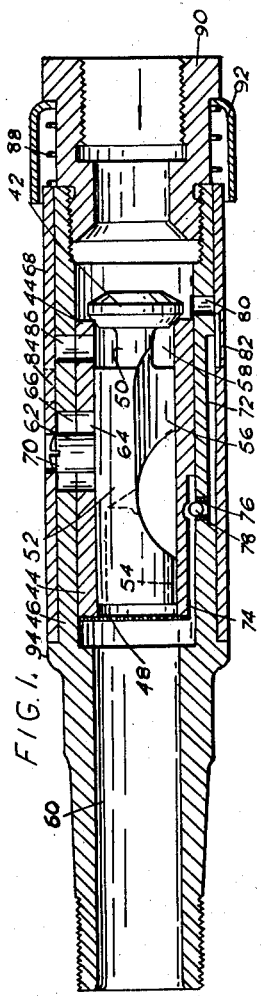
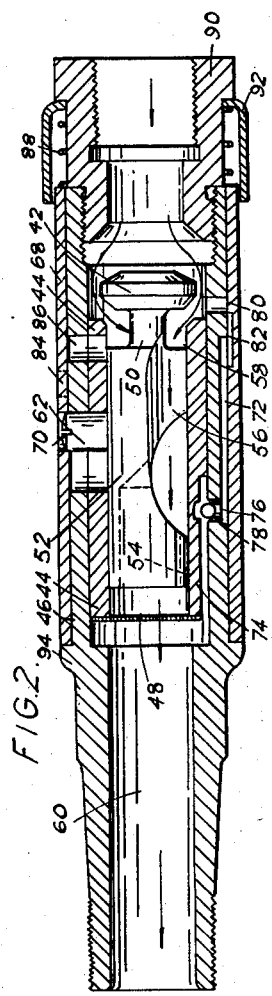
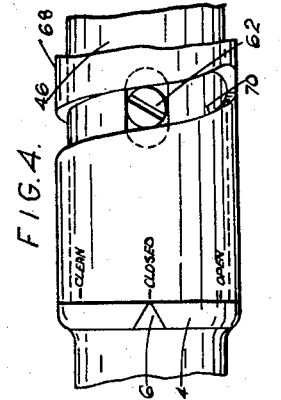
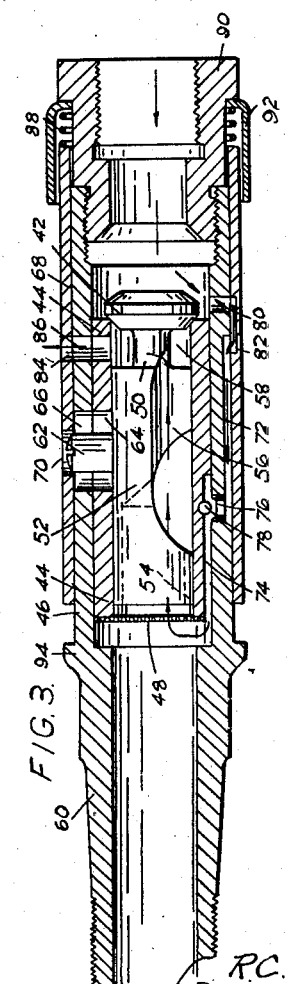
Inventor
R.C. WILES
By
Attorneys Patented June 5, 1945

2,377,595

UNITED STATES PATENT OFFICE 2,377,595

VALVE FOR PNEUMATIC TOOLS

Robert Clough Wiles, Heaton, Newcastle-on-Tyne, England, assignor to Charles Crofton and Company (Engineers) Limited, Wallsend-on-Tyne, England, a British company Original application May 5, 1942, Serial No. 441,847. Divided and this application February 18, 1944, Serial No. 522,932. In Great Britain May 19, 1941

3 Claims. (Cl. 183—39)

This application is a division of applicant's prior application, Serial Number 441,847, filed May 5, 1942.

This invention relates to a valve for controlling the supply of compressed air to pneumatic tools, this valve including a filter and the valve body being formed with a by-pass port and a movable part thereof with an exhaust passage, so that when the said movable part is in a certain position air is admitted to a part of the inlet pipe beyond the filter, through which the air returns and escapes through the exhaust passage, thereby cleaning the filter.

The present invention has for its object to provide improved facilities for cleaning the filter in that type of compressed air valve in which the movable member is a sleeve surrounding a tubular valve body interposed in the pipe line, the sleeve being rotated about the axis of the valve body in one direction to admit compressed air and in the other direction to shut off the air.

According to this invention the valve body is formed with a by-pass duct leading from a port under the control of the sleeve to a part of the inlet pipe beyond the filter, and an exhaust aperture is provided which is normally closed by the sleeve but is uncovered as a consequence of the movement of the sleeve to the position in which it admits compressed air to the aforesaid port.

Referring to the accompanying drawing:

Figures 1, 2 and 3 are longitudinal sectional views of a valve according to this invention, showing the moving parts thereof in three different positions.

Figure 4 is a plan view of a part of Figure 1.

Referring to the drawing, the valve body 46 has an extension 90 through which air under pressure enters, and, after passing the valves the air reaches the outlet 60 suitably connected to the pneumatic tool to be operated (not shown). The main air supply valve is of the mushroom type, consisting of the valve head 42 seated against that end of a socket member 44 within the valve body 46 which faces the incoming air, the other end of this socket member being covered by a disc 48 of wire gauze constituting the filter. The valve head 42 is joined by a stem 50 to a cylindrical plug 52 sliding within the socket member 44. The end of this plug 52 remote from the valve head is formed with a central bore 54 communicating with a wide groove 56 in the side of the plug which extends to the space 58 between the stem and the inner surface of the socket member 44. Thus, when the valve head 42 is moved away from the seating at the end of the socket 44, air can flow past the valve head through the groove 56 and the central bore 54 and through the filter 48 to the outlet 60 leading to the tool.

The plug 52 has a pin 62 extending from its side through longitudinal slots 64, 66 in the socket 44 and the valve body 46 respectively; these slots permitting the plug to slide endwise, but preventing it from turning. An outer sleeve 68 surrounds and rotates upon the valve body, and this sleeve 68 is formed with a helical slot 70 engaging the extremity of the pin 62, so that when the outer sleeve 68 is rotated in one direction while abutting against the shoulder at 94, the pin 62 is moved endwise to raise the valve head 42 from its seating, thereby admitting air (Figure 2). When the sleeve is turned in the other direction, and is still held against shoulder 94 by spring 88, the pin is moved the other way to close the valve, as in Figure 1.

There is a duct of small cross-section in the valve body leading from a port in the side of the body to the space immediately beyond the gauze filter 48. This duct is formed partly by a groove 72 in the outer surface of the valve body which also constitutes the port and partly by a groove 74 in the outer surface of the socket 44 in which plug 52 slides. The two grooves overlap and are placed in communication with one another by a hole 76 in the side of the valve body, the inner end of this hole constituting a seating for a ball 78 acting as a non-return valve. In the neighbourhood of the valve head 42 there is another hole 80 through the side of the valve body, on the same side as the groove 72 just referred to, but spaced away from it in the endwise direction. The hole 80 is placed in communication with the groove 72 by continuing to rotate the outer sleeve 68 beyond the "closed" position in the clockwise sense as seen from the right. As the valve head 42 is already closed down on to its seating, it cannot move any further, and so the sleeve 68 itself moves in the endwise direction towards the right against the action of spring 88. This movement brings a recess 82 in the inner surface of the sleeve 68 into register simultaneously with the groove 72 and the hole 80 so that air can pass through the hole 80, the recess 82, the groove 72, the hole 76 and the groove 74. At the same time an exhaust passage 84 in the opposite side of the outer sleeve 68 is brought into register with a hole 86 extending through the valve body and the socket 44 into the annular space 58 surrounding the valve stem. Thus, air is supplied to the space beyond the filter 48, returns through the filter, thereby cleaning it, through the central bore 54 and the groove 56 in the plug, into the annular space 58 around the valve stem and out through the hole 86 and exhaust passage 84.

The non-return ball valve 78 is provided to prevent escape of air backwards through the by-pass groove 72 and the clearance between the outer sleeve 68 and the valve body during normal operation, the valve body necessarily being cylindrical and the clearance therefore necessarily being somewhat large, and moreover liable to increase through wear.

The coil spring 88 which normally opposes endwise motion of the outer sleeve 68, surrounds a screwed-in extension 90 of the valve body and is housed in a shell 92 fixed to the extension 90 at one end and overlying the extremity of the outer sleeve 68 at the other end.

The shoulder 94 on the valve body against which the lefthand end of the outer sleeve abuts bears an index mark 96, and the outer sleeve 68 bears the words "open," "closed," "clean" in the appropriate positions, as shown in Figure 4.

It will be appreciated that when the sleeve is set to the "clean" position the air has to pass through passages of restricted cross section before reaching the filter, with the result that the velocity of the air in the pipe leading to the valve is restricted, being not greater than the velocity of the flow when the tool is being operated. Consequently there is no risk of pieces of scale or other gritty particles, which may be lying dormant in the pipe, being carried into the part of the valve body beyond the filter, from which they would be blown into the tool when the sleeve is next turned to the "on" position.

I claim:

1. A valve for controlling the supply of compressed air to pneumatic tools comprising in combination a valve body of circular cross section having passages therein for the entry and outlet of air, a valve member and a seating therefor in said valve body, a sleeve surrounding said valve body with a diagonal slot therein, a pin connected to said valve member projecting through a longitudinal slot in the valve body and into the diagonal slot in said sleeve, said valve member having a head adapted to close upon a seating in said valve body when the valve member is moved in one direction by the turning of said sleeve, a filter within the valve body in the outlet portion thereof, a passage of restricted cross-section in said valve body leading to an outlet beyond said filter, and ports in the valve body and the sleeve adapted in one position of said sleeve in which the valve member is closed on its seating, to connect the entry side of the valve body to said passage of restricted cross-section, and to connect the other side of said valve body between the filter and the valve member to the atmosphere.

2. A valve according to claim 1 having said sleeve normally bearing against a shoulder on the valve body preventing longitudinal movement of said sleeve in one direction, spring means tending to press said sleeve against said shoulder but permitting movement of said sleeve away from said shoulder when the sleeve is turned beyond the position for closing said valve member on its seating, said ports in the valve body and sleeve being so positioned as to be brought into register by movement of said sleeve away from said shoulder on the valve body.

3. A valve for controlling the supply of compressed air to pneumatic tools comprising in combination a valve body of circular form with longitudinal passages therein for entry and outlet of air, a longitudinally movable valve member and a seating therefor in said valve body, a filter within said valve body through which air normally passes after passing said valve member, a sleeve surrounding said valve body and normally bearing at one end against a shoulder on said valve body, a spring and means for supporting same on the valve body in a position to bear against the other end of said sleeve, means operable on turning of said sleeve in one direction for raising said valve member from its seating while said sleeve bears against said shoulder, and for causing said sleeve to move longitudinally against the action of said spring when turned in the opposite direction, and ports and passages in said valve body and said sleeve adapted as a consequence of such longitudinal movements of said sleeve to permit a restricted reverse flow of air through said filter and out to the atmosphere.

ROBERT CLOUGH WILES.